(12) United States Patent
Kaneko et al.

(10) Patent No.: US 10,984,794 B1
(45) Date of Patent: Apr. 20, 2021

(54) INFORMATION PROCESSING SYSTEM, INFORMATION PROCESSING APPARATUS, INFORMATION PROCESSING METHOD, AND RECORDING MEDIUM

(71) Applicants: Kabushiki Kaisha Toshiba, Minato-ku (JP); Toshiba Digital Solutions Corporation, Kawasaki (JP)

(72) Inventors: Yuki Kaneko, Ota (JP); Yasunari Tanaka, Yokohama (JP); Masahisa Shinozaki, Tokorozawa (JP); Hideo Umeki, Yokohama (JP); Hisako Yoshida, Kawasaki (JP); Ai Matsui, Yokohama (JP); Kenryo Kanaya, Hachioji (JP); Keiji Kubota, Kawasaki (JP); Kazuho Igoshi, Kawasaki (JP); Motokazu Iwasaki, Chiba (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 37 days.

(21) Appl. No.: 16/336,820

(22) PCT Filed: Sep. 13, 2017

(86) PCT No.: PCT/JP2017/033061
§ 371 (c)(1),
(2) Date: Mar. 28, 2019

(87) PCT Pub. No.: WO2018/061774
PCT Pub. Date: Apr. 5, 2018

(30) Foreign Application Priority Data

Sep. 28, 2016 (JP) .............................. JP2016-190399

(51) Int. Cl.
*G10L 15/22* (2006.01)
*G09B 7/02* (2006.01)
*G06F 16/22* (2019.01)

(52) U.S. Cl.
CPC .............. *G10L 15/22* (2013.01); *G06F 16/22* (2019.01); *G09B 7/02* (2013.01)

(58) Field of Classification Search
CPC ...... G06F 3/167; G06F 16/22; G06F 16/2308; G06F 16/9024; G06F 3/06; G06F 40/20;
(Continued)

(56) References Cited

U.S. PATENT DOCUMENTS 8,301,450 B2 * 10/2012 Lee ..................... G10L 15/1822
704/257
8,521,531 B1 * 8/2013 Kim ........................ G10L 15/22
704/252

(Continued)

FOREIGN PATENT DOCUMENTS

JP    2001-56225 A    2/2001
JP    2002-268901 A    9/2002
(Continued)

OTHER PUBLICATIONS

International Search Report dated Oct. 24, 2017 in PCT/JP2017/033061 filed on Sep. 13, 2017.

*Primary Examiner* — Gerald Gauthier
(74) *Attorney, Agent, or Firm* — Oblon, McClelland, Maier & Neustadt, L.L.P.

(57) ABSTRACT

An information processing system according to an embodiment includes a storage, a plurality of conversationers, and a selector. The storage stores a regulation rule indicating a generation rule of a speech in a conversation. Each of the plurality of conversationers makes conversation with a user on the basis of the regulation rule. The selector selects some (Continued)

or all of the plurality of conversationers to cause a conversation to be performed.

12 Claims, 12 Drawing Sheets

(58) Field of Classification Search
    CPC .......... G06F 40/30; G09B 7/02; G10L 15/22;
        G10L 15/18; G10L 15/1815; G10L 15/30
    USPC ................................ 704/235, 260, 270, 275
    See application file for complete search history.

(56) References Cited

U.S. PATENT DOCUMENTS

| | | | | |
|---|---|---|---|---|
| 8,560,325 | B2 * | 10/2013 | Kanevsky | G10L 15/1822 |
| | | | | 704/275 |
| 9,898,459 | B2 * | 2/2018 | Tang | G06F 40/284 |
| 9,953,648 | B2 * | 4/2018 | Choi | G10L 15/22 |
| 10,297,249 | B2 * | 5/2019 | Baldwin | G10L 17/22 |
| 10,331,784 | B2 * | 6/2019 | Swart | G06F 40/295 |
| 10,431,214 | B2 * | 10/2019 | Guo | G06F 40/20 |
| 10,559,309 | B2 * | 2/2020 | Carbune | G10L 15/30 |
| 10,614,799 | B2 * | 4/2020 | Kennewick, Jr. | G10L 15/18 |
| 10,699,708 | B2 * | 6/2020 | Lecue | G06F 16/9024 |
| 2001/0021909 | A1 * | 9/2001 | Shimomura | G10L 15/22 |
| | | | | 704/275 |
| 2002/0156845 | A1 | 10/2002 | Sakata | |
| 2003/0023442 | A1 * | 1/2003 | Akabane | G10L 13/08 |
| | | | | 704/260 |
| 2005/0021334 | A1 * | 1/2005 | Iwahashi | G10L 15/22 |
| | | | | 704/240 |
| 2012/0016678 | A1 * | 1/2012 | Gruber | B60K 35/00 |
| | | | | 704/275 |
| 2012/0185275 | A1 * | 7/2012 | Loghmani | G06F 19/328 |
| | | | | 705/3 |
| 2013/0281987 | A1 * | 10/2013 | Maeda | A61B 1/00039 |
| | | | | 606/1 |
| 2014/0108019 | A1 * | 4/2014 | Ehsani | H04L 12/282 |
| | | | | 704/275 |
| 2014/0111689 | A1 | 4/2014 | Kim et al. | |
| 2014/0142948 | A1 * | 5/2014 | Rathi | G06F 3/167 |
| | | | | 704/270.1 |
| 2014/0214425 | A1 * | 7/2014 | Bak | G10L 15/08 |
| | | | | 704/249 |
| 2015/0019217 | A1 * | 1/2015 | Di Cristo | G06F 16/335 |
| | | | | 704/235 |
| 2015/0179168 | A1 * | 6/2015 | Hakkani-Tur | G10L 15/22 |
| | | | | 704/257 |
| 2016/0203523 | A1 * | 7/2016 | Spasojevic | G06Q 30/0269 |
| | | | | 705/14.66 |
| 2018/0190266 | A1 * | 7/2018 | Sun | G10L 15/22 |

FOREIGN PATENT DOCUMENTS

| | | |
|---|---|---|
| JP | 2002-312377 A | 10/2002 |
| JP | 2008-512789 A | 4/2008 |
| JP | 2014-86088 A | 5/2014 |
| WO | WO 2006/031609 A2 | 3/2006 |

\* cited by examiner

| SCENE | CATEGORY | SUBCATEGORY | CONVERSATION AGENT |
|---|---|---|---|
| S001 | MEDICAL CONSULTATION | CRANIAL NERVE | A001, A005, ... |
| S002 | MEDICAL CONSULTATION | SKIN | A023, A035, ... |
| S003 | TRAVEL CONSULTATION | SOUTH EAST ASIA | A013, A042, ... |
| S004 | GENERAL CONVERSATION | | A007, A008, ... |
| ... | ... | ... | ... |

| TOPIC | SCENE | POSITIVE KEYWORD | NEGATIVE KEYWORD |
|---|---|---|---|
| T001 | S003 | THE PHILIPPINES, SCUBA DIVING | – |
| T002 | S040 | RICE | BREAD |
| T003 | S010 | XX HOSPITAL | XX DENTIST |
| T004 | S231 | – | A004 |
| ... | ... | ... | ... |

FIG. 10

| RANK | CONVERSATION AGENT | EVALUATION VALUE |
|---|---|---|
| 1 | A001 | 10100 |
| 2 | A012 | 8033 |
| 3 | A032 | 8004 |
| 4 | A008 | 7368 |
| ... | ... | ... |

FIG. 12

| CONVERSATION AGENT | CATEGORY | SUBCATEGORY | CHARACTER |
|---|---|---|---|
| A001 | MEDICINE | CRANIAL NERVE | CAREFUL |
| A002 | ECONOMY | LOGISTICS | CALM |
| A003 | TRAVEL | JAPAN | OPPORTUNISTIC |
| A004 | MIRRORING | JOHN SMITH | AGGRESSIVE |
| ... | ... | ... | ... |

FIG. 13

| USER | AGE | SEX | PREFERENCE | CHARACTER |
|---|---|---|---|---|
| U001 | 10 | MALE | HEALTH CARE | PASSIVE |
| U002 | 20 | MALE | GOURMET | BOLD |
| U003 | 55 | FEMALE | SPORTS | CAREFUL |
| U004 | 35 | FEMALE | TRAVEL | ACTIVE |
| ... | ... | ... | ... | ... |

US 10,984,794 B1

INFORMATION PROCESSING SYSTEM, INFORMATION PROCESSING APPARATUS, INFORMATION PROCESSING METHOD, AND RECORDING MEDIUM

TECHNICAL FIELD

Embodiments of the present invention relate to an information processing system, an information processing apparatus, an information processing method, and a recording medium.

BACKGROUND ART

There is a system that searches for a solution to a question from a user using an information processing technology and presents the solution to users. However, in the related art, for example, when there is no definite solution to the question or when a proposal from the system is desired, only an uniform optimal solution and proposal can be performed.

CITATION LIST

Patent Literature

PTL 1: Japanese Translation of PCT International Application Publication No. 2008-512789

SUMMARY OF THE INVENTION

Problems to be Solved by the Invention

An object to be solved by the present invention is to provide an information processing system, an information processing apparatus, an information processing method, and a recording medium capable of performing various responses to a speech of a user.

Means for Solving the Problems

An information processing system according to an embodiment includes a storage, a plurality of conversationers, and a selector. The storage stores a regulation rule indicating a generation rule of a speech in a conversation. Each of the plurality of conversationers makes conversation with a user on the basis of the regulation rule. The selector selects some or all of the plurality of conversationers to cause a conversation to be performed.

BRIEF DESCRIPTION OF DRAWINGS

FIG. 10 is a diagram illustrating a data structure of scene-based rank information according to the second embodiment.
FIG. 12 is a diagram illustrating a data structure of agent attribute information according to the third embodiment.
FIG. 13 is a diagram illustrating a data structure of user information according to the third embodiment.

EMBODIMENTS FOR CARRYING OUT THE INVENTION

Hereinafter, an information processing system, an information processing apparatus, an information processing method, and a recording medium according to embodiments will be described with reference to the drawings.

First Embodiment

An overview of an information processing system 1 according to a first embodiment will be described.

Figure 1:
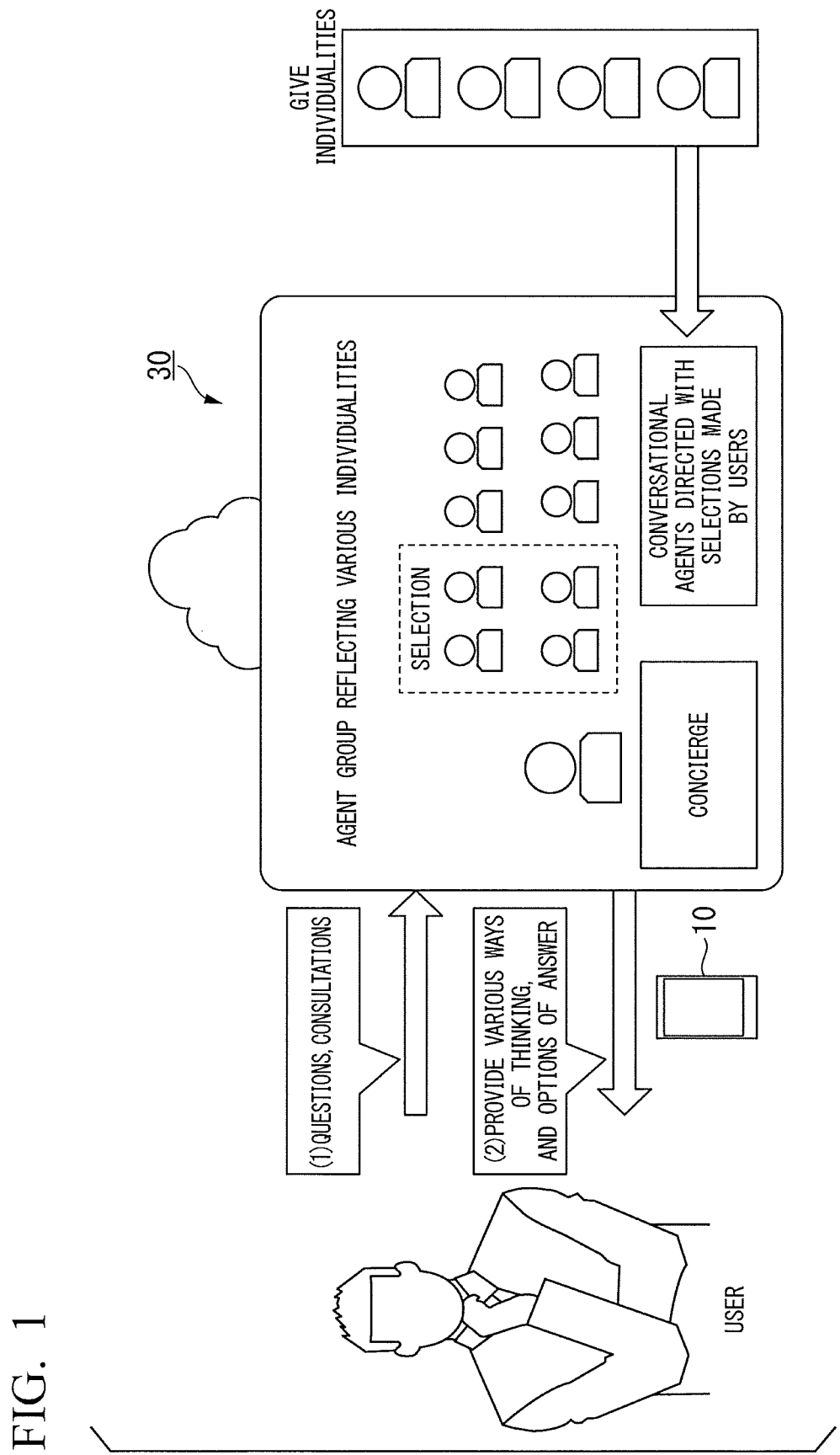
FIG. 1 is a diagram illustrating an overview of an information processing system according to a first embodiment.

FIG. 1 is a diagram illustrating an overview of an information processing system.

As illustrated in FIG. 1, the information processing system 1 is a system that replies with speech, an opinion, choices, and the like in response to a speech of a user. Hereinafter, a reply of the information processing system 1 to the speech of the user is referred to as a "response". In the following description, exchange between the speech of the user and the speech generated by the information processing system 1 is referred to as "conversation". It should be noted that the speech from the user input to the information processing system 1 or the responses output from the information processing system 1 are not limited to audio, and may be text or the like.

The information processing system 1 is provided with a configuration for generating a response. Hereinafter, a unit of a configuration capable of generating a response independently is referred to as an "agent". The information processing system 1 includes a plurality of agents. Each agent has a different individuality. Hereinafter, the "individuality" refers to an element having an influence on a tendency of the response, a content of a response, a method of representing a response, and the like. For example, the individuality of each agent is determined by elements such as a content of information used to generate a response (for example, teaching data of machine learning, history information to be described below, and user information), logical development in generation of the response, or an algorithm used for generation of the response. Individualization of agents may be performed using any method. Thus, since the information processing system 1 presents the responses generated by a plurality of agents having different individualities, the information processing system 1 can propose various ideas or options to the user and can support a decision of the user.

In the first embodiment, for example, there are two types of agents.

A first type of agent is an agent that generates a response accompanied by an opinion such as an opinion or impression. Hereinafter, the first type of agent is referred to as a "conversation agent".

A second type of agent is an agent that functions as a window in a conversation between the user and the information processing system 1. Hereinafter, the second type of agent is referred to as a "concierge". The concierge has a function of enabling an appropriate response to the speech of the user to be performed. For example, the concierge may pose a question to the user to clarify an intention of the speech of the user or specify a scene of the conversation. The scene is a type of background or phase of the speech of the user, and is also referred to as a situation.

The concierge selects a conversation agent that actually performs a response according to the scene. In other words, the concierge changes the conversation agent that actually performs the response among the conversation agents according to the scene. Hereinafter, the conversation agent that actually performs the response among the conversation agents may be referred to as a "response agent". "Actually perform a response" is to generate a response that is actually presented to the user. That is, the response generated by the response agent is presented to the user. On the other hand, a conversation agent that is not a response agent may not generate a response or may generate a response. A response generated by the conversation agent that is not a response agent is not presented to the user. Thus, since the information processing system 1 narrows down the response agent according to the scene, it is easy to present only a response suitable for the scene.

Next, a configuration of the information processing system 1 will be described.

Figure 2:
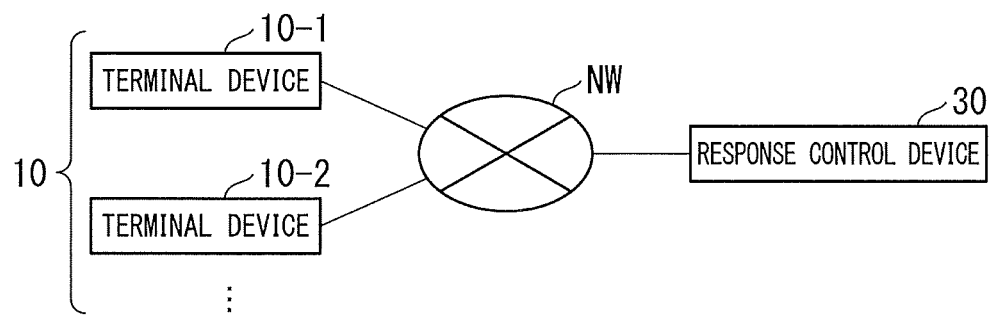
FIG. 2 is a block diagram illustrating a configuration of an information processing system according to the embodiment.

FIG. 2 is a block diagram illustrating the configuration of the information processing system 1.

The information processing system 1 includes a plurality of terminal devices 10-1, 10-2, . . . , and a response control device 30. Hereinafter, the plurality of terminal devices 10-1, 10-2, . . . are referred to as a terminal device 19 unless otherwise distinguished from each other. The terminal device 10 and the response control device 30 are communicatively connected via a network NW.

The terminal device 10 is an electronic device including a computer system. Specifically, the terminal device 10 is a personal computer, a mobile phone, a tablet, a smartphone, a personal handy-phone system (PHS) terminal device, a game machine, or the like. The terminal device 10 receives an input from the user and presents information to the user.

The response control device 30 is an electronic device including a computer system. Specifically, the response control device 30 is a server device or the like. The response control device 30 implements an agent. In the first embodiment, a case where an agent is realized by artificial intelligence will be described. The artificial intelligence is a computer system that imitates an intellectual function of a human, such as learning, inference, and determination. An algorithm for realizing the artificial intelligence may be arbitrary. Specifically, the artificial intelligence may be realized by a neural network, case-based inference, or the like.

Here, an overview of a flow of a process in the information processing system 1 will be described.

The terminal device 10 receives an input of speech from the user. The terminal device 10 transmits information indicating the speech of the user to the response control device 30. The response control device 30 receives the information indicating the speech of the user from the terminal device 10. The response control device 30 refers to the information indicating the speech of the user and generates information indicating a response according to the speech of the user. The response control device 30 transmits the information indicating a response to the terminal device 10. The terminal device 10 receives the information indicating a response from the response control device 30. The terminal device 10 refers to the information indicating the response and presents content of the response through display or audio.

Next, a configuration of the terminal device 10 will be described.

Figure 3:
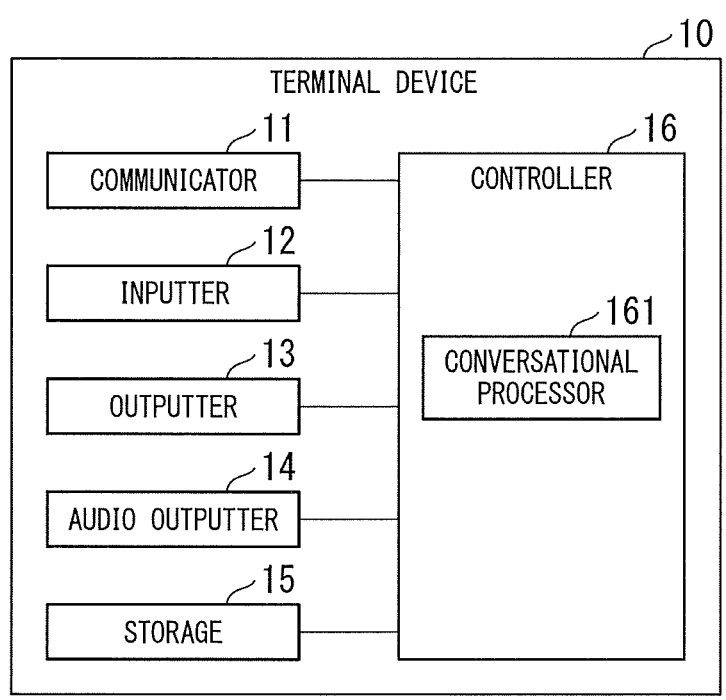
FIG. 3 is a block diagram illustrating a configuration of a terminal device according to the embodiment.

FIG. 3 is a block diagram illustrating the configuration of the terminal device 10.

The terminal device 10 includes a communicator 11, an inputter 12, a display 13, an audio outputter 14, a storage 15, and a controller 16.

The communicator 11 transmits and receives various types of information to and from another device connected to the network NW, such as the response control device 30. The communicator 11 includes a communication integrated circuit (IC) or the like.

The inputter 12 receives an input of various types of information. For example, the inputter 12 receives an input of speech of the user and selection of a conversation scene. The inputter 12 may receive an input from the user using any method such as character input, audio input, or pointing. The inputter 12 includes a keyboard, a mouse, a touch sensor, a microphone, and the like.

The display 13 displays various types of information. For example, the display 13 displays the content of the speech of the user, the content of the response of the agent, and the like. The display 13 includes a liquid crystal display panel, an organic electro-luminescence (EL) display panel, and the like.

The audio outputter 14 reproduces various sound sources. For example, the audio outputter 14 outputs audio or the like of the response. The audio outputter 14 includes a speaker, a woofer, and the like.

The storage 15 stores various types of information. For example, the storage 15 stores a program executable by a central processer (CPU) included in the terminal device 10, information referred to by the program, and the like. The storage 15 includes a read only memory (ROM), a random access memory (RAM), and the like.

The controller 16 controls various components included in the terminal device 10. For example, the controller 16 is realized by the CPU included in the terminal device 10 executing the program stored in the storage 15. The controller 16 includes a conversation processer 161.

The conversation processer 161 controls an input and output process for a conversation. For example, the conversation processer 161 executes a process of providing a user interface for a conversation. In addition, for example, the conversation processer 161 controls transmission and reception of the information indicating the speech of the user or the information indicating the response to and from the response control device 30.

Next, a configuration of the response control device 30 will be described.

Figure 4:
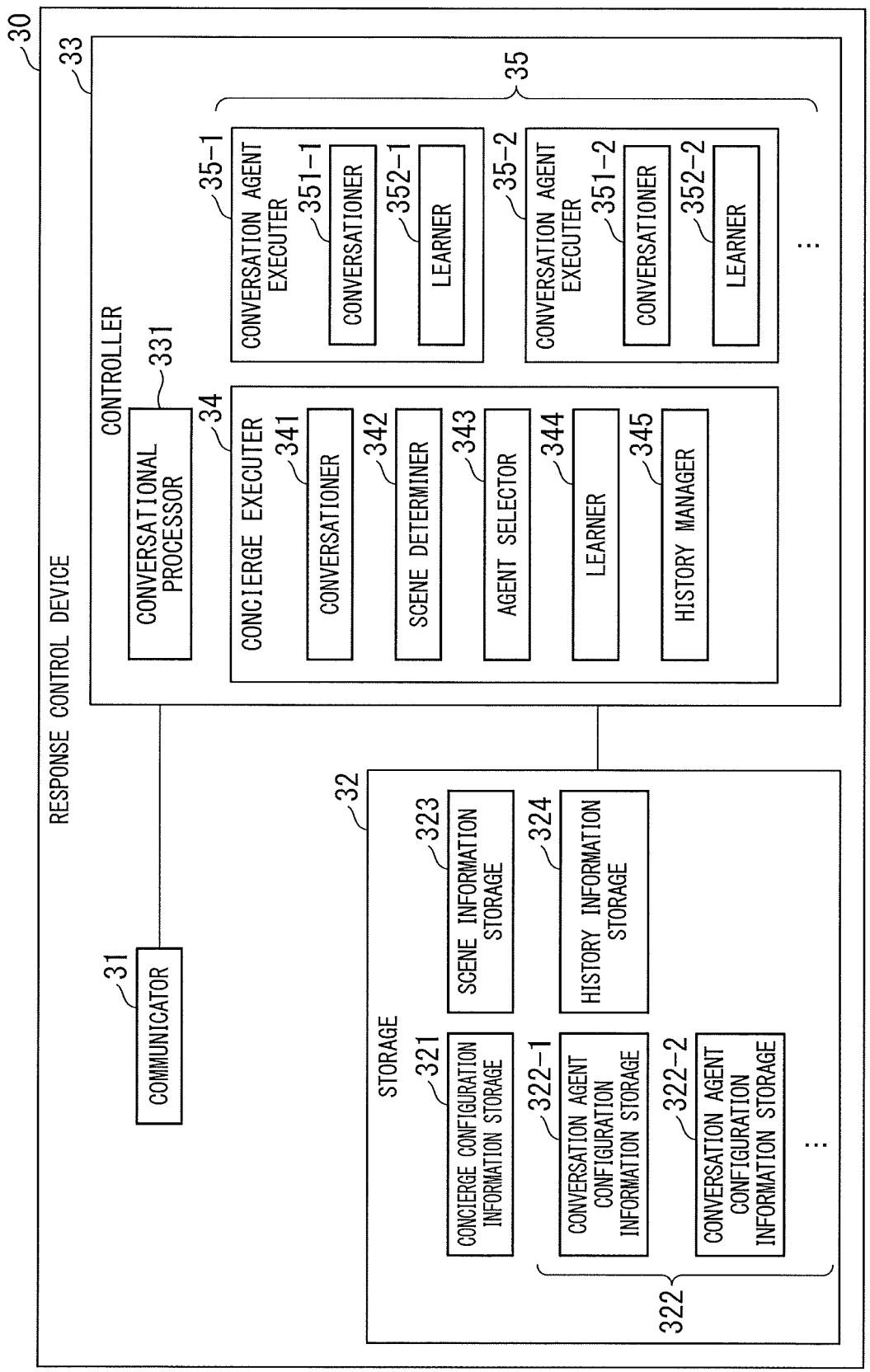
FIG. 4 is a diagram illustrating a configuration of a response control device according to the embodiment.

FIG. 4 is a block diagram illustrating the configuration of the response control device 30.

The response control device 30 includes a communicator 31, a storage 32, and a controller 33.

The communicator 31 transmits and receives various types of information to and from another device connected to the network NW, such as the terminal device 10. The communicator 31 includes a communication IC or the like.

The storage 32 stores various types of information. For example, the storage 32 stores a program that can be executed by the CPU included in the response control device 30, information that is referred to by the programs, and the like. The storage 32 includes a ROM, a RAM, and the like. The storage 32 includes a concierge configuration information storage 321, one or more conversation agent configuration information storages 322-1, 322-2, . . . , a scene information storage 323, and a history information storage 324. Hereinafter, the conversation agent configuration information storages 322-1, 322-2, . . . are collectively referred to as a conversation agent configuration information storage 322, unless otherwise distinguished from each other.

The concierge configuration information storage 321 stores concierge configuration information. The concierge configuration information is information indicating a configuration of a concierge executer 34 to be described below. For example, when the concierge executer 34 is realized by a neural network, the concierge configuration information includes information such as a result of machine learning, for example, parameters of an activation function varying due to machine learning. The concierge configuration information is an example of information indicating a generation rule of a response in a conversation.

The conversation agent configuration information storage 322 stores conversation agent configuration information. The conversation agent configuration information is information indicating the configuration of the conversation agent executer 35 to be described below. For example, when the conversation agent executer 35 is realized by a neural network, the conversation agent configuration information includes information such as a result of machine learning, for example, a parameter of an activation function varying due to machine learning. The conversation agent configuration information is an example of information indicating a generation rule of a response in a conversation.

In a case where the concierge executer 34 and the conversation agent executer 35 are realized by means other than artificial intelligence, the concierge information and the conversation agent configuration information are, for example, information acquired by uniquely associating a speech and a response in reply to the speech or the like.

The scene information storage 323 stores scene information. The scene information is information in which a scene is associated with a conversation agent.

Here, an example of the data structure of the scene information will be described.

Figures 5, 6, 7:
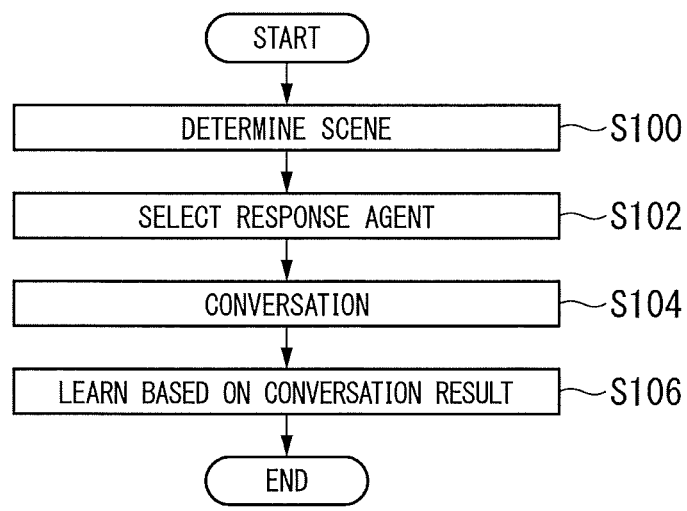
FIG. 5 is a diagram illustrating a data structure of scene information according to the embodiment.
FIG. 6 is a diagram illustrating a data structure of history information according to the embodiment.
FIG. 7 is a flowchart illustrating a flow of a process in the information processing system according to the embodiment.

FIG. 5 is a diagram illustrating a data structure of the scene information.

The scene information is information in which scene identification information ("scene" in FIG. 5), category information ("category" in FIG. 5), subcategory information ("subcategory" in FIG. 5), and conversation agent identification information ("conversation agent" in FIG. 5) are associated with each other.

The scene identification information is information for uniquely identifying a scene. The category information is information indicating a large classification of a scene. The subcategory information is information indicating a small classification of a scene. The conversation agent identification information is information for uniquely identifying the conversation agent. In the scene information, one or more conversation agent identification information may be associated with one piece of scene identification information.

Thus, in the scene information, the scene and the conversation agent are associated with each other. Therefore, the terminal device 10 and the response control device 30 can select a conversation agent according to the scene by referring to the scene information.

Referring back to FIG. 4, description of the configuration of the response control device 30 will be continued.

The history information storage 324 stores history information. The history information is information indicating a history of the conversation between the user and the information processing system 1. The history information may be managed for each user.

An example of the data structure of history information will be described herein.

FIG. 6 is a diagram illustrating a data structure of the history information.

The history information is information in which topic identification information ("topic" in FIG. 6), the scene identification information ("scene" in FIG. 6), positive keyword information ("positive keyword" in FIG. 6), and negative keyword information "negative keyword" in FIG. 6) are associated with each other.

The topic identification information is information for uniquely identifying a conversation. The positive keyword information is information indicating a keyword in which the user shows a positive reaction in the conversation. The negative keyword information is information indicating a keyword in which the user shows a negative reaction in the conversation. In the history information, one or more items of positive keyword information and negative keyword information may be associated with one piece of scene identification information.

Thus, the history information indicates the history of the conversation. That is, it is possible to ascertain the tendency of the response desirable for each user from the history information by referring to the history information. Therefore, the terminal device 10 and the response control device 30 can prevent a user from making a proposal difficult to receive or make a proposal easy for the user to receive by referring to the history information.

Referring back to FIG. 4, description of the configuration of the response control device 30 will be continued.

The controller 33 controls various components included in the response control device 30. For example, the controller 33 is realized by the CPU included in the response control device 30 executing the program stored in the storage 32. The controller 33 includes an conversation processor 331, a concierge executer 34, and one or more conversation agent executers 35-1, 35-2, . . . . Hereinafter, the conversation agent executers 35-1, 35-2, . . . are collectively referred to as a conversation agent executer 35 unless otherwise distinguished from each other.

The conversation processor 331 controls an input and output process for conversation. The conversation processer 331 is a configuration on the response control device 30 side corresponding to the conversation processer 161 of the terminal device 10. For example, the conversation processer 331 controls transmission and reception of the information indicating the speech of the user or information indicating the response to and from the terminal device 10.

The concierge executer 34 functions as a concierge. The concierge executer 34 is realized on the basis of the concierge configuration information. The concierge executer 34 includes a conversationer 341, a scene determiner 342, an agent selector 343, a learner 344, and a history manager 345.

The conversationer 341 generates a concierge response to the speech of the user.

The scene determiner 342 determines the scene of the conversation on the basis of a mode of a conversation start request from the user. For example, the scene determiner 342 may determine the scene of the conversation on the basis of selection of the scene of the user. In this case, at the start of the conversation, a type of the scene may be displayed to be selectable on the display 13 so that selection of the scene may be received from the user. For example, the scene determiner 342 may determine the scene on the basis of the speech of the user. In this case, information in which keywords and scenes are associated with each other is prepared in advance. The scene determiner 342 may determine the scene from a correspondence relationship between the keywords included in the speech of the user and the scene. In the concierge executer 34, the corresponding relationship between the speech and the scene may be machine learned in advance, and the scene may be determined on the basis of a result of the machine learning and the speech of the user. Thus, the scene determiner 342 may determine the scene of the conversation using any method.

The agent selector 343 selects a conversation agent corresponding to the scene. The agent selector 343 refers to the scene information and specifies the conversation agent associated with the scene specified by the scene determiner 342. In other words, the agent selector 343 searches for the scene information using the scene determined by the scene determiner 342, and specifies a candidate for a response agent. The agent selector 343 selects a response agent from among the specified conversation agents. The selection of the response agent from candidates may be performed randomly or in a predetermined order. Accordingly, the agent selector 343 can select a conversation agent corresponding to the scene.

Here, the agent selector 343 may select a predetermined number of conversation agents or may select the number of conversation agents according to the conversation. For example, in the scene information, the number of response agents may be set in advance for each scene and the number of agents according to the scene may be selected. For example, designation of the number of conversation agents may be received from the user at the beginning of the conversation or during the conversation, and the number of conversation agents designated by the user may be selected.

The agent selector 343 may select a response agent on the basis of the history information. For example, the agent selector 343 may preferentially select the conversation agent for which the user has performed a positive speech from the history of the conversation. Thus, the agent selector 343 may refer to the history information, estimate compatibility between the user and the conversation agent, and select the conversation agent compatible with the user as the response agent.

In addition, the agent selector 343 may select the response agent a plurality of times in one conversation. In other words, the agent selector 343 may reselect the response agent. That is, the agent selector 343 may select a response agent for each session in one conversation. For example, when a response different from the presented response is requested in the speech of the user, the agent selector 343 newly reselects a different conversation agent different from the selected response agent as a response agent.

For example, the agent selector 343 may reselect the response agent when conversation has not resulted. For example, when a predetermined number of speeches are performed from the start of the conversation, when a predetermined time has elapsed from the start of the conversation, or when a positive speech is not performed from the user to the presented response, the agent selector 343 may determine that conversation has not resulted. For example, the agent selector 343 may reselect the response agent when the conversation scene is switched. Thus, by enabling the reselection of the response agent, the information processing system 1 can further present various responses.

In addition, the agent selector 343 may select a conversation agent not associated with the scene determined by the scene determiner 342 in the scene information as a response agent. That is, the agent selector 343 may select a conversation agent that does not correspond to the scene. For example, the agent selector 343 may select a conversation agent not corresponding to about one or two scenes as a response agent.

Such a conversation agent is likely to perform a response not suitable for a scene, whereas another conversation agent is likely to perform a greatly different response. Thus, the agent selector 343 sets some of the response agents as conversation agents according to the scene, and sets the other response agents as conversation agents irrelevant to the scene. Accordingly, the information processing system 1 can present a response easy for the user to receive and can diversify the responses.

The learner 344 performs machine learning for realizing the function of the concierge executer 34. The learner 344 is capable of executing two types of machine learning including machine learning that is performed before the start of use of the user and machine learning based on evaluation of the user in a conversation. A result of the machine learning in the learner 344 is reflected in the concierge configuration information. It should be noted that hereinafter, it is assumed that "evaluation" is an index indicating accuracy or precision of the response to the user.

Teacher data used for machine learning in the learner 344 may be prepared for each function of the concierge. For example, in machine learning for generation of a response, the teacher data is data in which the speech of the user, the response, and the evaluations are associated with each other. For example, in machine learning for distinguishing a scene, the teacher data is data in which the speech of the user, the scene, and the evaluation are associated with each other. For example, in machine learning for selection of a conversation agent, the teacher data is data in which a scene, a conversation agent, and an evaluation are associated with each other. By superimposing learning using such teaching data, the concierge executer 34 can generate a response, distinguish a scene, or select a conversation agent.

The history manager 345 manages history information. For example, when a positive phrase is included in the speech of the user, the history manager 345 specifies a keyword of the speech of the user or a keyword of the response corresponding to the phrase, and registers the keyword in the positive keyword information. For example, when a negative phrase is included in the speech of the user, the history manager 345 specifies a keyword of the speech of the user or the keyword of the response corresponding to the phrase, and registers the keyword in the negative keyword information. Thus, the history manager 345 performs addition, editing, deletion, or the like on the history information according to the data structure of the history information.

Each of the conversation agent executers 35-1, 35-2, . . . functions as a different conversation agent. The conversation agent executers 35-1, 35-2, . . . are realized on the basis of the conversation agent configuration information stored in the conversation agent configuration information storages 322-1, 322-2, . . . . The conversation agent executers 35-1, 35-2, . . . include conversationers 351-1, 351-2, . . . , and learners 352-1, 352-2, . . . . Hereinafter, the conversationers 351-1, 351-2, . . . are collectively referred to as a conversationer 351. Hereinafter, the learners 352-1, 352-2, . . . are collectively referred to as a learner 352.

The conversationer 351 generates a response of the conversation agent to the speech of the user.

The learner 352 performs machine learning for realizing the function of the conversation agent executer 35. The learner 352 is capable of executing two types of machine learning including machine learning that is performed before the start of use of the user and machine learning based on evaluation of the user in a conversation. A result of machine learning in the learner 352 is reflected in the conversation agent configuration information.

The teacher data that is used for machine learning in the learner 352 is data in which the speech of the user, a response, and an evaluation are associated with each other. By superimposing learning using such teaching data, the conversationer 351 can generate a response according to the speech of the user.

Next, an operation of the information processing system 1 will be described.

FIG. 7 is a flowchart illustrating a flow of a process in the information processing system 1.

(Step S100) The response control device 30 determines the scene, for example, on the basis of the selection of the scene of the user. Then, the information processing system 1 proceeds to a process of step S102.

(Step S102) The response control device 30 selects a response agent on the basis of a scene determination result in step S100. Then, the information processing system 1 proceeds to a process of step S104.

(Step S104) The information processing system 1 interacts with the user using the response agent. The response control device 30 generates a response to the speech of the user using the response agent. The terminal device 10 presents the speech of the user and the response generated by the response agent according to the speech to the user. Thereafter, the information processing system 1 proceeds to a process of step S106.

(Step S106) The response control device 30 performs machine learning of the concierge and the conversation agent on the basis of a result of the conversation. The conversation result is, for example, a general response of the user to the presented response or a general conversation, and indicates selection of the response agent or evaluation of a response of the response agent. Thereafter, the information processing system 1 ends the process illustrated in FIG. 7.

It should be noted that the evaluation of the user for machine learning in step S106 may be specified from the speech of the user or may be input by the user after the conversation. The evaluation may be input as binary values including positive and negative, may be input as three or more levels of values, or may be converted into a value from a natural sentence. The evaluation may also be performed on the basis of conversation. For example, the number of speeches of the user in the conversation, the number of responses, and the length of conversation indicate that the conversation has been active. Therefore, the number of speeches of the user in the conversation, the number of responses, and a length of the conversation may be used as indices of the evaluation.

The evaluation target may be all agents or may be some of agents. For example, evaluation for the whole conversation may be reflected in all agents participating in the conversation. The evaluation to the response may be reflected only in an agent who has performed the response. In addition, the evaluation may be reflected only for some functions of the concierge. For example, in the functions of the concierge, the evaluation may be reflected only in a determination of the scene, or the evaluation may be reflected only in the selection of the conversation agent.

It should be noted that the process illustrated in FIG. 7 may be performed in an order different from the order illustrated in FIG. 7. For example, the processes of steps S100, S102, and S106 may be performed as part of the process of step S104. In this case, at the beginning of the conversation, the concierge responds to the speech of the user, and the processes of steps S100 and S102 may be performed in this conversation. The information processing system 1 may omit the process of step S106.

Next, a response presentation aspect in a conversation will be described.

Figure 8:
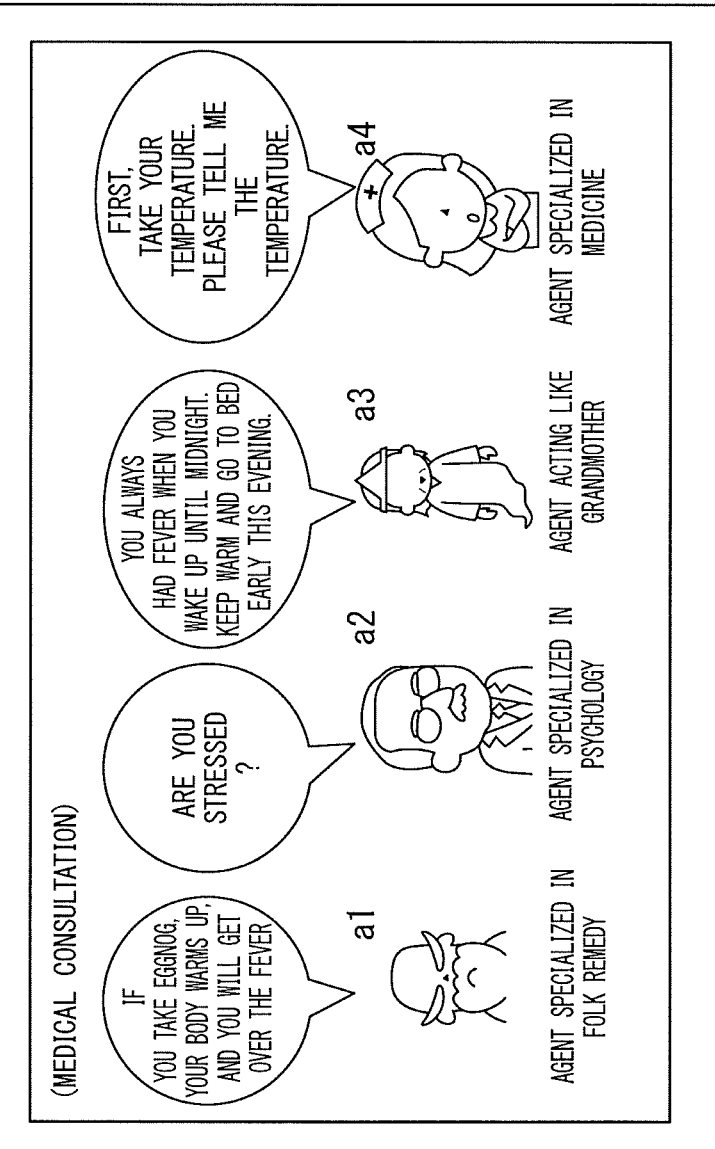
FIG. 8 is a diagram illustrating an example of presenting a response in the information processing system according to the embodiment.
Figure 8:
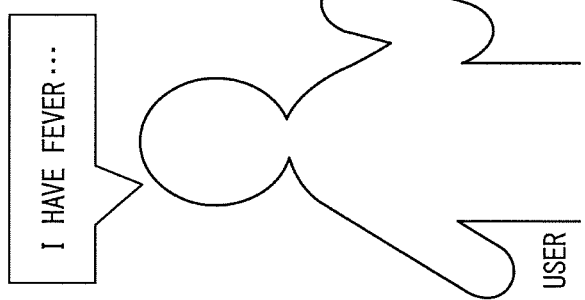

FIG. 8 is a diagram illustrating an example of presenting a response in the information processing system 1.

In the example illustrated in FIG. 8, the information processing system 1 determines that the scene is "medical consultation" from a keyword "feverish" of the speech of the user "feverish . . . ". The information processing system 1 selects four conversation agents a1 to a4 corresponding to the scene of "medical consultation" as a response agent. The response agents generate independent responses to the speech of "feverish . . . ", respectively. The terminal device 10 displays the responses of the respective response agents side by side, and displays each response in association with an attribute of the response agent. Thus, the user can confirm the response agent and the response generated by the response agent at a time.

As described above, the information processing system 1 (an example of an information processing system) according to the first embodiment includes a storage 32 (an example of a storage), a plurality of conversationers 351 (an example of a conversationer), an agent selector 343 (an example of a selector). The storage 32 stores conversation agent configuration information (an example of a regulation rule) indicating a generation rule of a speech in a conversation. The conversationer 351 performs conversation with the user on the basis of the conversation agent configuration information. The agent selector 343 selects some or all of the plurality of conversationers 351 to cause a conversation to be performed.

Accordingly, the information processing system 1 generates a speech using the selected conversationer 351 among the plurality of conversationers 351 and performs a conversation. For example, the information processing system 1 generates a plurality of responses in parallel to one speech of the user. Therefore, the information processing system 1 can perform various responses to the speech of the user.

The information processing system 1 includes a scene determiner 342 (an example of a scene determiner). The scene determiner 342 determines the scene of the conversation on the basis of a state of a conversation start request of one session from the user. Using the scene determined by the scene determiner 342, the agent selector 343 searches for scene information (an example of scene-based correspondence information) in which the scene is associated with one or more conversationers 351, and selects some or all of the plurality of conversationers 351.

Accordingly, the information processing system 1 selects the conversationer 351 according to the scene of the conversation. That is, the information processing system 1 switches the conversationer 351 that performs a response to each scene. Therefore, the information processing system 1 can perform an appropriate response according to the scene to the speech of the user.

In the information processing system 1, the conversationer 351 can generate speech by referring to the history of conversations performed with the user in the past.

Accordingly, the information processing system 1 generates the speech on the basis of the past conversation. For example, the information processing system 1 can confirm the speech rejected by the user from the history of the conversation, and confirm the speech that the user likes. Therefore, the information processing system 1 can perform an appropriate response to the speech of the user according to the user.

Second Embodiment

A second embodiment will be described. In the second embodiment, the same configurations as those described above are denoted by the same reference numerals, and the description is cited.

An information processing system 1A (not illustrated) according to the second embodiment is a system that performs a response using a plurality of conversation agents, similar to the information processing system 1. However, the information processing system 1 selects the response agent on the basis of the predetermined correspondence relationship between the scene and the conversation agent, whereas the information processing system 1A selects the response agent on the basis of evaluation of the conversation agent for each scene.

A configuration of the information processing system 1A will be described.

The information processing system 1A includes a response control device 30A instead of the response control device 30 included in the information processing system 1.

Figure 9:
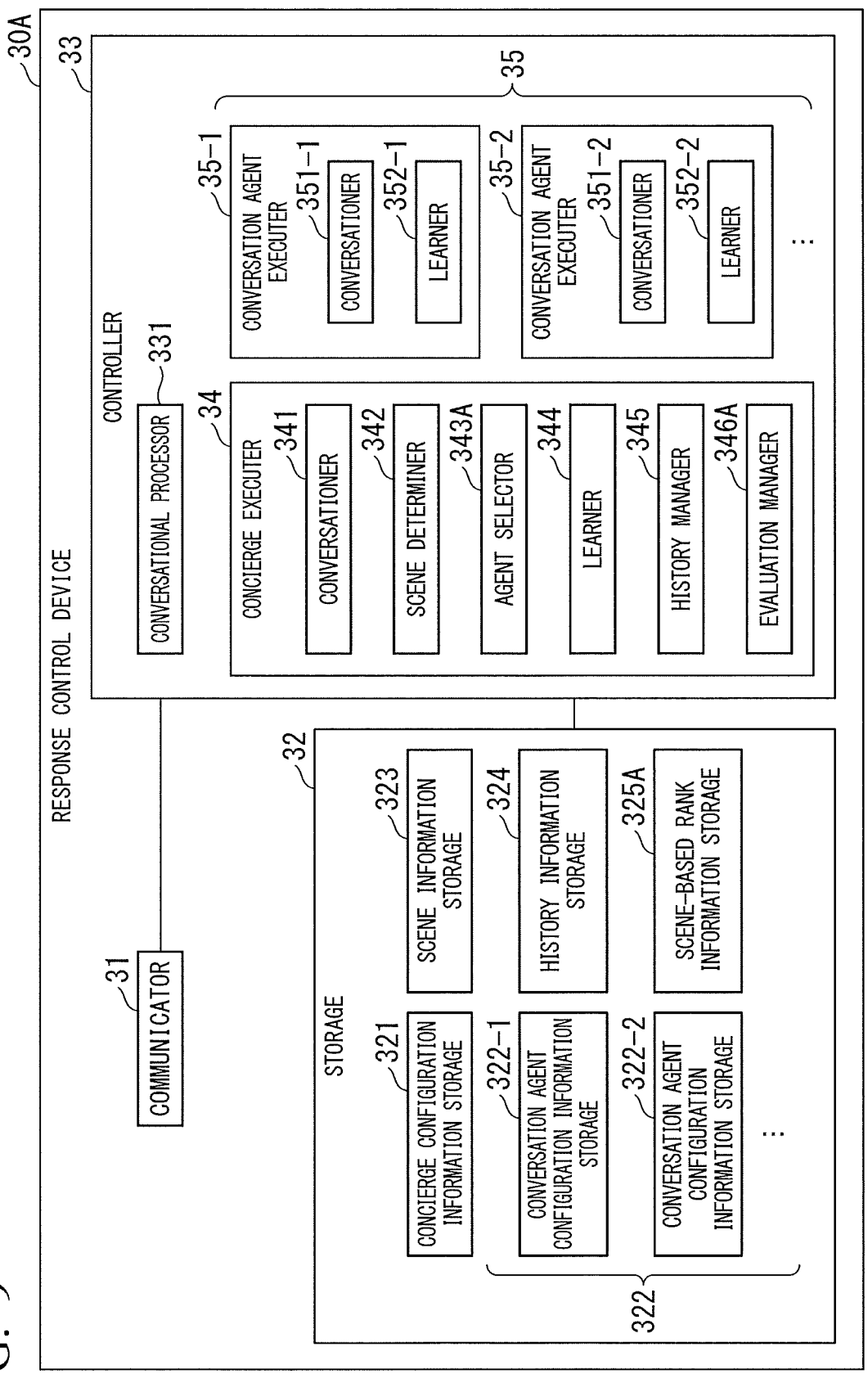
FIG. 9 is a block diagram illustrating a configuration of a response control device according to a second embodiment.

FIG. 9 is a block diagram illustrating a configuration of the response control device 30A.

The storage 32 of the response control device 30A includes a scene-based rank information storage 325A. The concierge executer 34 of the response control device 30A includes an evaluation manager 346A. In addition, the concierge executer 34 of the response control device 30A includes an agent selector 343A instead of the agent selector 343 included in the concierge executer 34 of the response control device 30.

The scene-based rank information storage 325A stores scene-based rank information. The scene-based rank information is information indicating evaluation of the conversation agent for each scene. The scene-based rank information is managed for each scene.

An example of a data structure of the scene-based rank information will be described herein.

FIG. 10 is a diagram illustrating the data structure of the scene-based rank information.

The scene-based rank information is information in which rank information ("rank" in FIG. 10), conversation agent identification information ("conversation agent" in FIG. 10), and evaluation value information ("evaluation value" in FIG. 10) are associated with each other.

The rank information is information indicating a priority of the conversation agent in the selection of the response agent. The evaluation value information is information indicating an evaluation value of the conversation agent. In the example illustrated in FIG. 10, the higher the evaluation value, the higher the priority of the conversation agent is set.

Thus, in the scene-based rank information, the priority in selection of the response agent and the conversation agent are associated with each scene. Therefore, the terminal device 10 and the response control device 30 can select a conversation agent with high evaluation in each scene as a response agent by referring to the scene-based rank information.

Referring back to FIG. 9, description of the configuration of the response control device 30 A will be continued.

The evaluation manager 346A manages the scene-based rank information. For example, the evaluation manager 346A may increase or decrease the evaluation value of the response agent in the scene-based rank information on the basis of the evaluation of the user for the conversation. For example, the evaluation manager 346A may increase or decrease the evaluation value of the response agent in the scene-based rank information on the basis of the speech of the user in the conversation.

Specifically, when the user performs a positive speech to the response of the response agent, the evaluation manager 346A may increase the evaluation value of the response agent by a predetermined amount. When the user performs a negative speech to the response of the response agent, the evaluation manager 346A may decrease the evaluation value of the response agent by a predetermined amount. The evaluation manager 346A updates the correspondence relationship between the priority and the conversation agent according to the increase or decrease in the evaluation value.

The agent selector 343A selects the response agent from the conversation agents, similar to the agent selector 343. However, the agent selector 343A differs from the agent selector 343 in that the agent selector 343A can select a response agent by referring to the scene-based rank information. For example, the agent selector 343A may select a conversation agent in descending order of priority in the scene-based rank information. For example, the agent selector 343A may group the conversation agents according to the priority and select a predetermined number of conversation agents as response agents from each group. Thus, a method of selecting the response agent by referring to the scene-based rank information may be arbitrary.

As described above, the information processing system 1A (an example of an information processing system) includes an evaluation manager 346A (an example of an evaluator). The evaluation manager 346A performs evaluation for each scene on the plurality of conversationers 351. The agent selector 343A (an example of a selector) selects some or all of the plurality of conversationers 351 on the basis of the scene-based rank information (an example of scene-based evaluation information) indicating the evaluation for each scene with respect to the plurality of conversationers 351.

Thus, the information processing system 1A selects the conversationer 351 on the basis of the evaluation for each scene. For example, the information processing system 1A preferentially selects the conversationer 351 highly evaluated in each scene. Therefore, the information processing system 1A can perform an appropriate response according to the scene on the speech of the user.

Third Embodiment

A third embodiment will be described. In the third embodiment, the same configurations as those described above are denoted by the same reference numerals, and the description is cited.

An information processing system 1B (not illustrated) according to the third embodiment is a system that performs a respond using a plurality of conversation agents, similar to the information processing system 1. However, the information processing system 1 selects the response agent on the basis of the predetermined correspondence relationship between the scene and the conversation agent, whereas the information processing system 1B selects the response agent on the basis of a relationship between the user and the conversation agent.

Next, a configuration of the information processing system 1B will be described.

The information processing system 1B includes a response control device 30B instead of the response control device 30 included in the information processing system 1.

Figure 11:
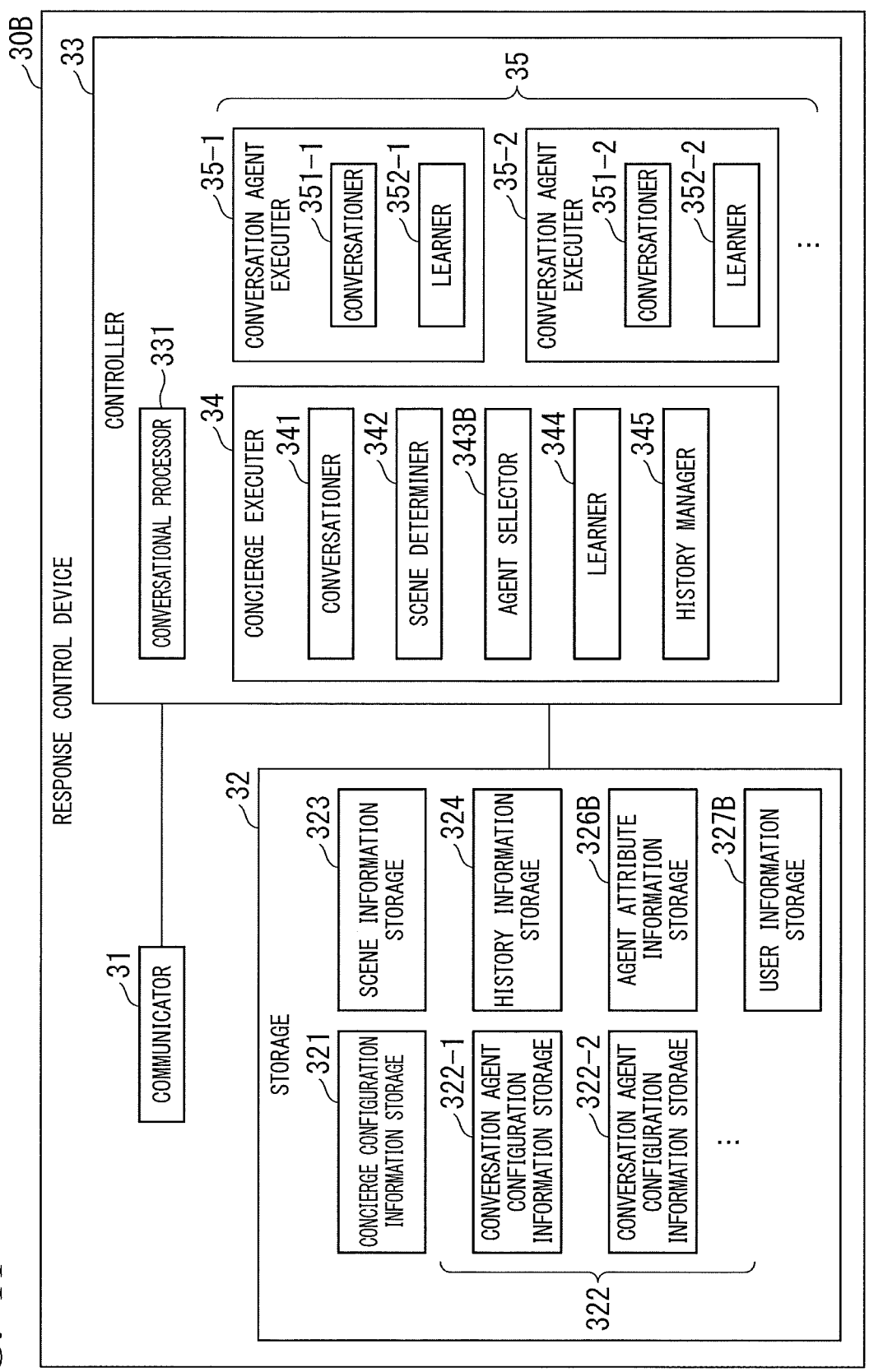
FIG. 11 is a block diagram illustrating a configuration of a response control device according to a third embodiment.

FIG. 11 is a block diagram illustrating the configuration of the response control device 30B.

The storage 32 of the response control device 30B includes an agent attribute information storage 326B and a user information storage 327B. In addition, the concierge executer 34 of the response control device 30 B includes an agent selector 343B instead of the agent selector 343 included in the concierge executer 34 of the response control device 30.

The agent attribute information storage 326 B stores agent attribute information. The agent attribute information is information indicating the attribute of the conversation agent.

Here, an example of the data structure of the agent attribute information will be described.

FIG. 12 is a diagram illustrating a data structure of the agent attribute information.

The agent attribute information is information in which conversation agent identification information ("conversation agent" in FIG. 12), conversation agent category information ("category" in FIG. 12), conversation agent subcategory information ("subcategory" in FIG. 12), conversation agent character information ("character" in FIG. 12) are associated with each other.

The conversation agent category information is information indicating a large classification of the conversation agents. The conversation agent subcategory information is information indicating a small classification of the conversation agents. The conversation agent character information is a character of the conversation agent, that is, information indicating tendency of the speech.

Thus, in the agent attribute information, the conversation agent and an attribute thereof are associated with each other. In other words, the agent attribute information indicates the individuality of the conversation agent. Therefore, the terminal device 10 and the response control device 30 can confirm the individuality of the conversation agent by referring to the agent attribute information.

Referring back to FIG. 11, description of the configuration of the response control device 30B will be continued.

The user information storage 327B stores user information. The user information is information indicating the attribute of the user.

An example of a data structure of user information will be described herein.

FIG. 13 is a diagram illustrating the data structure of the user information.

The user information is information in which user identification information ("user" in FIG. 13), age information ("age" in FIG. 13), sex information ("sex" in FIG. 13), preference information ("preference" in FIG. 13), and user character information ("character" in FIG. 13) are associated with each other.

The user identification information is information for uniquely identifying a user. The age information is information indicating the age of the user. The sex information is information indicating a sex of the user. The preference information is information indicating the preference of the user. The user character information is information indicating a character of the user.

Thus, in the user information, the user and the attribute are associated with each other. In other words, the user information indicates the individuality of the user. Therefore, the terminal device 10 and the response control device 30 can confirm the individuality of the user by referring to the user information.

Referring back to FIG. 11, description of the configuration of the response control device 30B will be continued.

The agent selector 343B selects a response agent from among the conversation agents, similar to the agent selector 343. However, the agent selector 343B is different from the agent selector 343 in that the agent selector 343B can select a response agent by referring to the agent attribute information and the user information.

The agent selector 343B may select a response agent on the basis of a relevance between the agent attribute information and the user information. For example, the agent selector 343B may select a conversation agent close to the individuality of the user as a response agent by referring to the agent attribute information and the user information. Accordingly, since the individuality of the user and the individuality of the response agent can be matched, it is possible to select a response agent that performs a proposal easy for the user to receive.

The agent selector 343 may select a response agent on the basis of diversity of the agent attribute information and the user information. For example, the agent selector 343B may select a conversation agent having an individuality different from that of the user as a response agent by referring to the agent attribute information and the user information. Thus, it is possible to select a response agent that performs a proposal difficult for the user to come up with. Thus, a method of selecting the response agent by referring to the agent attribute information and the user information may be arbitrary. It should be noted that information indicating a perspective between the individuality of the user and the individuality of the conversation agent, that is, correspondence relationship between attributes may be determined in advance.

The agent selector 343B may select a response agent by referring to the scene information or may select the response agent without referring to the scene information. When the agent selector 343B refers to the scene information, the agent selector 343B may select a conversation agent that is close in individuality to the user or different in individuality from the user among the conversation agents associated with the scene in the scene information.

As described above, in the information processing system 1B (an example of an information processing system), the agent selector 343B (an example of a selector) selects some or all of the plurality of conversationers 351 on the basis of a relevance between the user information (an example of user attribute information) indicating the attribute of the user who performs conversation and the agent attribute information indicating the attribute of the conversationer 351 (an example of the conversationer attribute information), and diversity.

Accordingly, the information processing system 1B selects the conversationer 351 on the basis of the attribute of the user and the attribute of the conversationer 351. That is, the information processing system 1B selects the conversationer 351 by distinguishing the conversationer 351 of which the attribute is close to or different from the user. In other words, the information processing system 1B selects the conversationer 351 on the basis of a relationship between the user and the conversationer 351. Therefore, the information processing system 1B can perform an appropriate response according to the user.

It should be noted that the concierge executer 34 and the conversation agent executer 35 may refer to the user information at the time of response, respectively. Accordingly, the concierge executer 34 and the conversation agent executer 35 can generate responses different for each user, even in response to the same speech.

The user information (an example of the user attribute information) may be able to be referred to only by the predetermined concierge executer 34 and the conversation agent executer 35. In other words, the reference to the user information may be limited for some of the plurality of conversationers 341 and the conversationer 351. That is, only some of the plurality of conversationers 341 and the conversationer 351 may be able to generate a response by referring to the user information.

In particular, when the conversation agent executer 35 is used to respond to a plurality of users, the result of machine learning to other users is reflected in response to a certain user. When this machine learning includes personal information of other users, personal information may be included in the generated response, and there is concern that the personal information of the user may be leaked. In this regard, the personal information is not included in the response by limiting reference to user information. Thus, the use of any information described in the embodiment may be limited by designation from the user or an initial setting.

Fourth Embodiment

A fourth embodiment will be described. In this embodiment, the same configurations as those described above are denoted by the same reference numerals, and the description is cited. The information processing system 1C (not illustrated) according to the fourth embodiment is a system that performs a response using a plurality of conversation agents, similar to the information processing system 1. However, the information processing system 1 selects the response agent on the basis of the predetermined correspondence relationship between the scene and the conversation agent, whereas the information processing system 1C selects the response agent on the basis of the evaluation of the conversation agent for each user. In other words, the information processing system 1C selects a response agent on the basis of the high affinity between the user and the conversation agent.

Next, the configuration of the information processing system 1C will be described.

The information processing system 1C includes a response control device 30C instead of the response control device 30 included in the information processing system 1.

Figure 14:
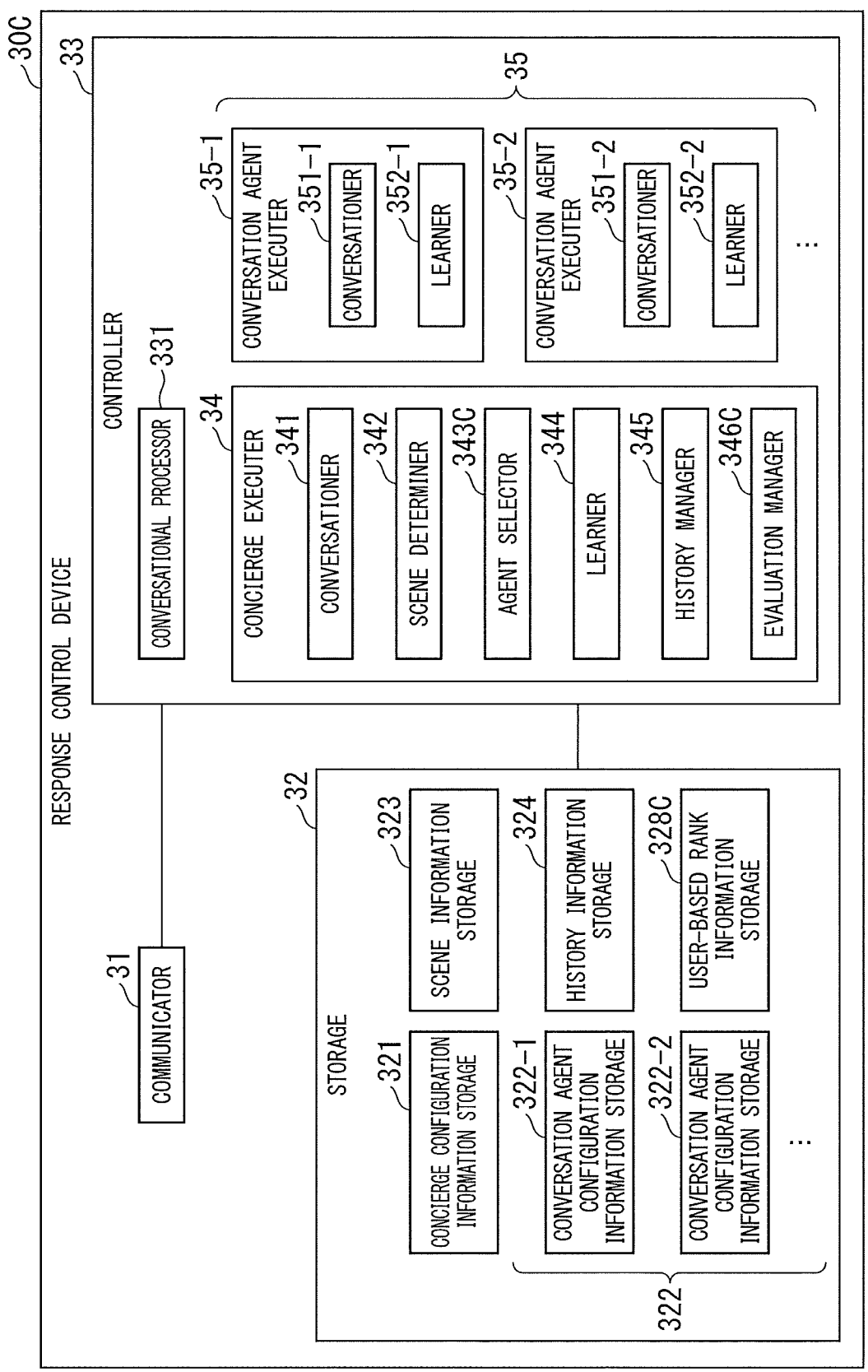
FIG. 14 is a block diagram illustrating a configuration of a response control device according to a fourth embodiment.

FIG. 14 is a block diagram illustrating the configuration of the response control device 30C.

The storage 32 of the response control device 30C includes a user-based rank information storage 328C. The concierge executer 34 of the response control device 30C includes an evaluation manager 346C. In addition, the concierge executer 34 of the response control device 30C includes an agent selector 343C instead of the agent selector 343 included in the concierge executer 34 of the response control device 30.

The user-based rank information storage 328C stores user-based rank information. The user-based rank information is information indicating the evaluation of the conversation agent for each user. The user-based rank information is managed for each user. The user-based rank information may be managed for each scene in addition to each user. The data structure of the user-based rank information may be the same as, for example, the data structure of the scene-based rank information described with reference to FIG. 10.

It is possible to associate the priority in the selection of the response agent and the conversation agent with each other for each user using the user-based rank information by configuring the user-based rank information as described above. Therefore, the terminal device 10 and the response control device 30 can select a conversation agent with high evaluation from each user as a response agent by referring to the user-based rank information.

The evaluation manager 346C manages the user-based rank information. For example, the evaluation manager 346C may increase or decrease the evaluation value of the response agent in the user-based rank information on the basis of the evaluation of the user on the conversation. For example, the evaluation manager 346C may increase or decrease the evaluation value of the response agent in the user-based rank information on the basis of the speech of the user in the conversation. Specifically, when the user performs a positive speech to the response of the response agent, the evaluation manager 346C may increase the evaluation value of the response agent. When the user performs a negative speech on the response of the response agent, the evaluation manager 346C may decrease the evaluation value of the response agent. The evaluation manager 346C updates the correspondence relationship between the priority and the conversation agent according to the increase or decrease in the evaluation value.

The agent selector 343C selects a response agent from among the conversation agents, similar to the agent selector 343. However, the agent selector 343C is different from the agent selector 343 in that the agent selector 343C can select a response agent by referring to the user-based rank information. For example, the agent selector 343C may select a conversation agent in descending order of priority in the user-based rank information. For example, the agent selector 343C may group the conversation agents according to the priority, and select a predetermined number of conversation agents as response agents from each group. Thus, a method of selecting the response agent by referring to the user-based rank information may be arbitrary.

The agent selector 343C may select the response agent by referring to the scene information or may select the response agent without referring to the scene information. When the agent selector 343C refers to the scene information, the agent selector 343C may select the conversation agent in descending order of priority in the user-based rank information among the conversation agents associated with the scene in the scene information.

As described above, the information processing system 1C (an example of an information processing system) includes an evaluation manager 346C (an example of an evaluator). The evaluation manager 346C performs evaluation of each user on each of the plurality of conversationers 351. The agent selector 343C (an example of the selector) selects some or all of the conversation agent executers 35 on the basis of the user-based rank information (an example of the user-based evaluation information) indicating the evaluation of each user of the plurality of conversation agent executers 35 (an example of the conversationer).

Accordingly, the information processing system 1C selects the conversationer 351 on the basis of the evaluation of each user. For example, the information processing system 1A preferentially selects the conversationer 351 evaluated to be high by the user who has performed the speech. Therefore, the information processing system 1C can perform an appropriate response according to the user.

Fifth Embodiment

A fifth embodiment will be described. In the fifth embodiment, the same configurations as those described above are denoted by the same reference numerals, and the description is cited.

The information processing system 1D (not illustrated) according to the fifth embodiment is a system that performs a response using a plurality of conversation agents, similar to the information processing system 1. In the information processing system 1, however, the response control device 30 has a concierge function, whereas in the information processing system 1D, a terminal device of the user has a concierge function.

A configuration of the information processing system 1D will be described.

The information processing system 1D includes a terminal device 10D and a response control device 30D instead of the terminal device 10 and the response control device 30 included in the information processing system 1.

Figure 15:
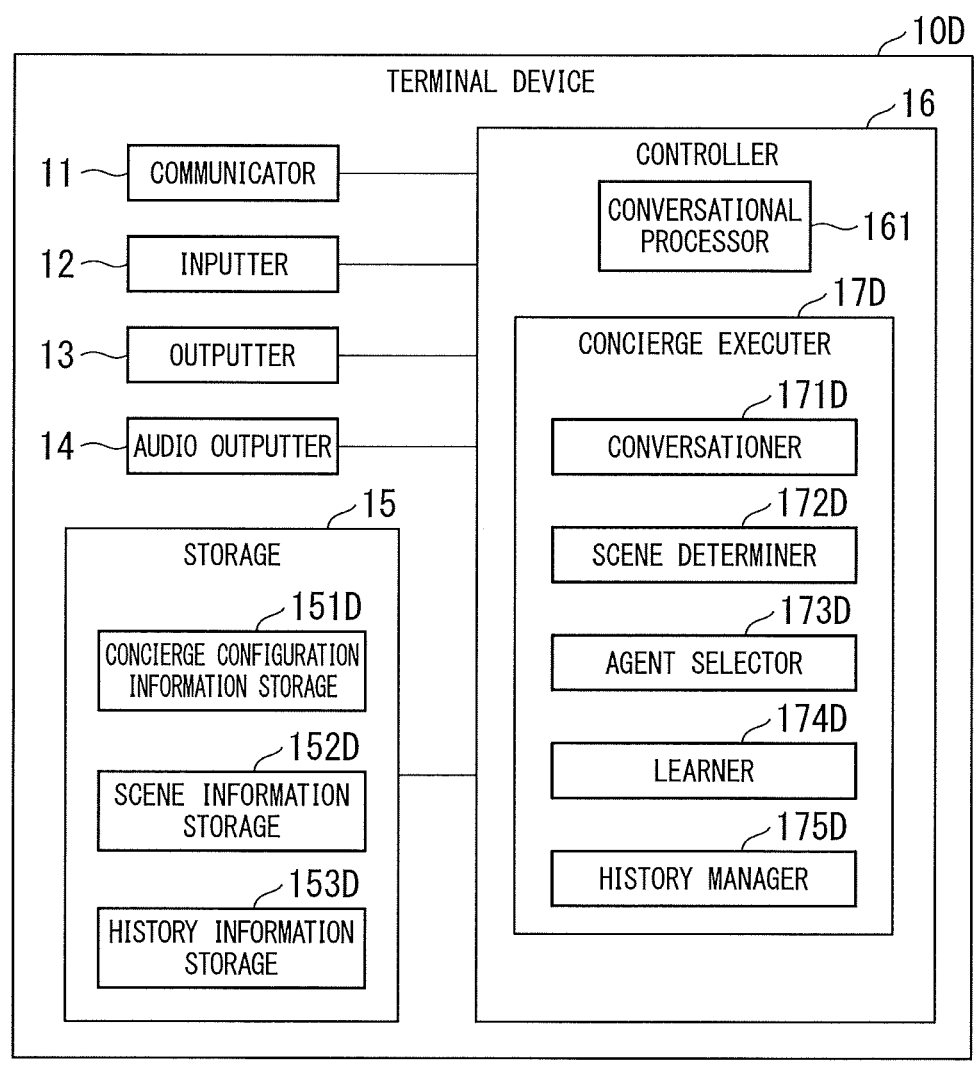
FIG. 15 is a block diagram illustrating a configuration of a terminal device according to a fifth embodiment.

FIG. 15 is a block diagram illustrating a configuration of the terminal device 10D.

The storage 15 of the terminal device 10D includes a concierge configuration information storage 151D, a scene information storage 152D, and a history information storage 153D. The controller 16 of the terminal device 10D includes a concierge executer 17D. The concierge executer 17D includes an conversationer 171D, a scene determiner 172D, an agent selector 173D, a learner 174D, and a history manager 175D.

The concierge configuration information storage 151D has the same configuration as the concierge configuration information storage 321. The scene information storage 152D has the same configuration as the scene information storage 323. The history information storage 153D has the same configuration as the history information storage 324. The concierge executer 17D has the same configuration as the concierge executer 34.

The concierge executer 17D has the same configuration as the concierge executer 34. The conversationer 171D has the same configuration as the conversationer 341. The scene determiner 172D has the same configuration as the scene determiner 342. The agent selector 173D has the same configuration as the agent selector 343. The learner 174D has the same configuration as the learner 344. The history manager 175D has the same configuration as the history manager 345.

Figure 16:
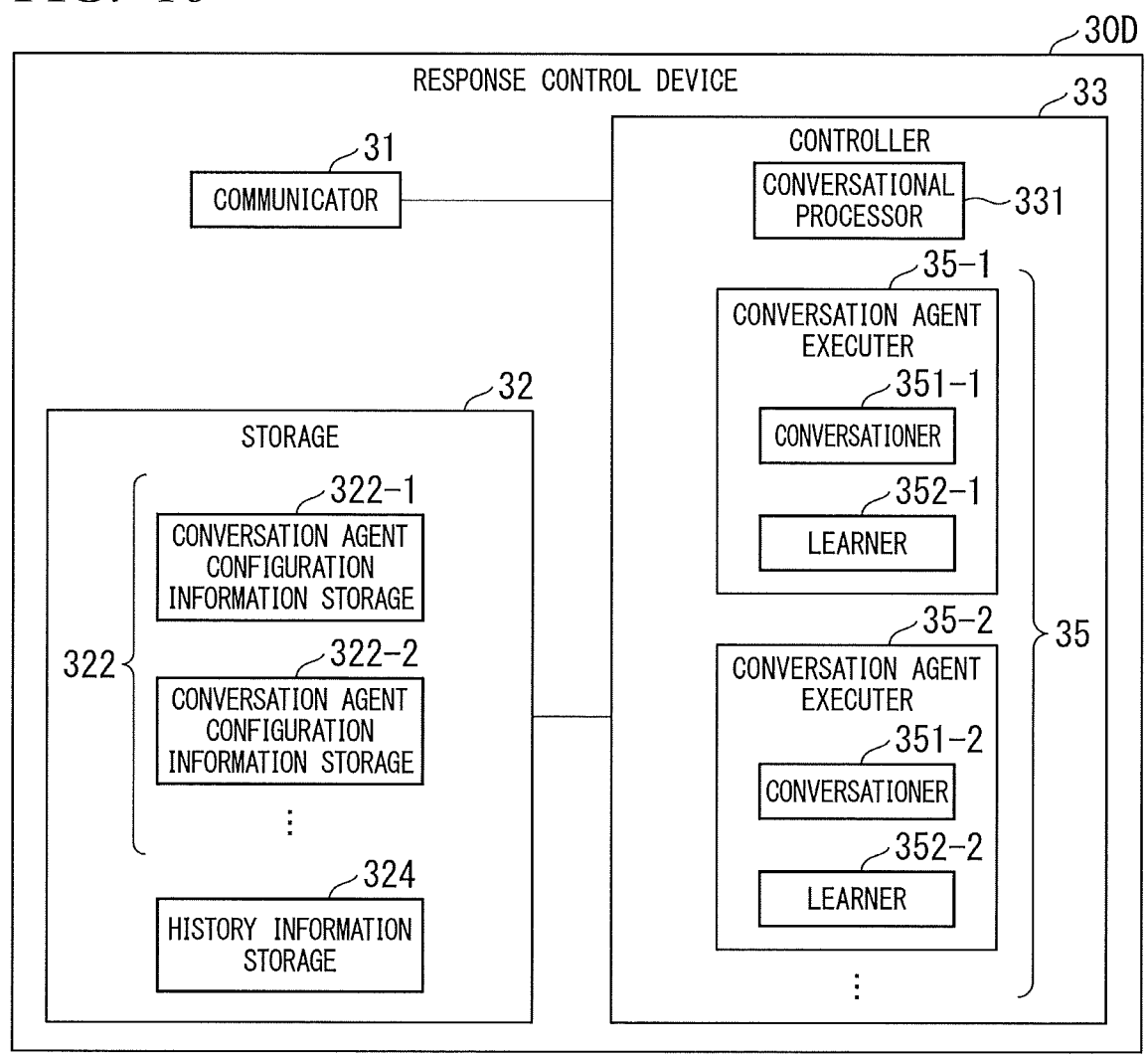
FIG. 16 is a block diagram illustrating a configuration of a response control device according to the fifth embodiment.

FIG. 16 is a block diagram illustrating a configuration of the response control device 30D.

The storage 32 of the response control device 30D does not include the concierge configuration information storage 321 and the scene information storage 323 included in the storage 32 of the response control device 30. The controller 33 of the response control device 30D does not include the concierge executer 34.

As described above, in the information processing system 1D (an example of an information processing system), the terminal device 10D includes the concierge executer 17D. Thus, any configurations in the above-described embodiments may be separated and provided in separate devices or may be combined.

It should be noted that in the above embodiment, a data structure of various types of information is not limited to the above-described structure. The association of each piece of information may be performed directly or indirectly. In addition, information that is not essential for a process may be omitted, or similar information may be added and processed. For example, a location, an occupation, or the like of a user may be included as user information. For example, the history information may not be aggregated content of the conversation, unlike the above embodiment, and may also be information obtained by recording the conversation itself.

It should be noted that in the above embodiment, the response presentation aspect is not limited to the one described above. For example, each speech may be presented in chronological order. For example, the response may be presented without clarifying the response agent who has performs a response.

It should be noted that in each of the above embodiments, the controller 16 and the controller 33 are software functional units, but may be hardware functional units such as a large scale integration (LSI).

According to at least one embodiment described above, it is possible to perform various responses by including the plurality of conversationers 351.

A program for realizing the functions of the terminal devices 10 and 10D, the response control devices 30, 30A to 30D may be recorded on a computer-readable recording medium, and the program recorded in the recording medium may be loaded into the computer system and executed, thereby performing processes of the terminal devices 10 and 10D and the response control devices 30 and 30A to 30D. Here, "load a program recorded on a recording medium into a computer system and execute the program" includes installing the program in the computer system. The "computer system" referred to herein includes an OS or hardware such as peripheral devices. The "computer system" may include a plurality of computer devices connected via a network including the Internet, a WAN, a LAN, and a communication line such as a dedicated line. "Computer-readable recording medium" refers to a portable medium such as a flexible disk, a magneto-optical disc, a ROM, and a CD-ROM, and a storage device such as a hard disk built in a computer system. Thus, the recording medium storing the program may be a non-transient recording medium such as a CD-ROM. The recording medium also includes a recording medium provided inside or outside accessible from a distribution server in order to distribute the program. Code of the program stored in the recording medium of the distribution server may be different from code of the program in a format that can be executed by a terminal device. That is, a format stored in the distribution server does not matter as long as the program can be installed in a form that can be downloaded from the distribution server and executed by the terminal device. It should be noted that a configuration in which the program is divided into a plurality of programs, and respective programs are downloaded at different timings and then combined in a terminal device, or a distribution server that distributes each of the divided programs may be different. The "computer-readable recording medium" may also include a recording medium that holds a program for a certain time, such as a volatile memory (RAM) inside a computer system including a server or a client when the program is transmitted over a network. The program may be a program for realizing some of the above-described functions. The program may be a program capable of realizing the above-described functions in combination with a program previously stored in the computer system, that is, a so-called differential file (differential program).

Some or all of the functions of the terminal devices 10 and 10D, the response control devices 30 and 30A to 30D described above may be realized as an integrated circuit such as an LSI. Each functional block described above may be individually realized as a processor, or some or all thereof may be integrated and realized as a processor. An integrated circuit realization scheme is not limited to the LSI and the functions may be realized as a dedicated circuit or a general-purpose processor. In a case where an integrated circuit realization technology with which the LSI is replaced appears with the advance of a semiconductor technology, an integrated circuit according to the technology may be used.

Although several embodiments of the invention have been described, the embodiments have been presented by way of example and are not intended to limit the scope of the invention. These embodiments can be implemented in various other forms, and various omissions, substitutions, and changes can be made without departing from the gist of the invention. These embodiments or modifications thereof are included in the invention described in the claims and an equivalent scope thereof, as included in the scope or gist of the invention.

The invention claimed is:

1. An information processing system comprising:
   a storage that stores a regulation rule indicating a generation rule of a speech in a conversation;
   a plurality of conversationers that each makes conversation with a user on the basis of the regulation rule; and
   a selector that selects some or all of the plurality of conversationers to cause a conversation to be performed, wherein
   the storage comprises a scene information storage that stores scene information in which a scene is associated with each of the conversationers, the scene being a situation of the speech, a characterization of the conversation, and/or an intention of the speech, and
   the selected some or all of the plurality of conversationers makes the conversation with the user according to the scene information.

2. The information processing system according to claim 1, further comprising:
   a scene determiner that determines a scene of a conversation on the basis of an aspect of a conversation start request of one session from the user,
   wherein the selector searches for scene-based correspondence information in the scene information storage using the scene determined by the scene determiner, and selects the some or all of the plurality of conversationers.

3. The information processing system according to claim 1, further comprising:
   an evaluator that evaluates the plurality of conversationers for each of the scenes,
   wherein the selector selects the some or all of the plurality of conversationers on the basis of scene-based evaluation information including the evaluation of the plurality of conversationers for each of the scenes by the evaluator.

4. The information processing system according to claim 1, further comprising:
   an evaluator that evaluates the plurality of conversationers for each of the users,
   wherein the selector selects the some or all of the plurality of conversationers on the basis of user-based evaluation information including the evaluation of the plurality of conversationers for each of the users by the evaluator.

5. The information processing system according to claim 1,
   wherein the selector selects the some or all of the plurality of conversationers on the basis of a relevance between user attribute information indicating an attribute of the user who performs conversation and conversationer attribute information indicating an attribute of the conversationer.

6. The information processing system according to claim 1,
   wherein the selector selects the some or all of the plurality of conversationers on the basis of diversity between user attribute information indicating an attribute of the user who performs conversation and conversationer attribute information indicating an attribute of the conversationer.

7. The information processing system according to claim 5,
   wherein reference to the user attribute information is limited for the some of the plurality of conversationers.

8. The information processing system according to claim 1, wherein the generation rule includes a result of machine learning such as a parameter of an activation function varying due to machine learning.

9. The information processing system according to claim 1, wherein the generation rule uniquely associates the speech and a response in reply to the speech.

10. An information processing apparatus comprising:
    a plurality of conversationers that each makes conversation with a user on the basis of a regulation rule stored in a storage in advance, the regulation rule indicating a generation rule of a speech in a conversation; and
    a selector that selects some or all of the plurality of conversationers to cause a conversation to be performed,
    wherein the selected some or all of the plurality of conversationers makes the conversation with the user according to scene information in which a scene is associated with the selected some or all of the plurality of conversationers, the scene being a situation of the speech, a characterization of the conversation, and/or an intention of the speech.

11. An information processing method, comprising:
    storing a regulation rule indicating a generation rule of a speech in a conversation;
    storing scene information in which a scene is associated with each of a plurality of conversationers that each make conversation with a user on the basis of the regulation rule
    selecting some or all of the plurality of conversationers to cause a conversation to be performed, wherein
    the selected some or all of the plurality of conversationer makes the conversation with the user according to the scene information, the scene being a situation of the speech, a characterization of the conversation, and/or an intention of the speech.

12. A non-transitory recording medium storing a program for causing a computer to function as:
   a plurality of conversationers that each makes conversation with a user on the basis of a regulation rule stored in a storage in advance; and
   a selector that selects some or all of the plurality of conversationers to cause a conversation to be performed,
   wherein the selected some or all of the plurality of conversationers makes the conversation with the user according to scene information in which a scene is associated with the selected some or all of the plurality of conversationers, the scene being a situation of the speech, a characterization of the conversation, and/or an intention of the speech.

* * * * *